United States Patent Office 3,505,427
Patented Apr. 7, 1970

3,505,427
PROCESS FOR THE PREPARATION OF INTERNALLY PLASTICIZED EPOXIDE RESINS
Zissis Aggias, Hilden, Rhineland, Germany, assignor to Henkel & Cie G.m.b.H., Dusseldorf-Holthausen, Germany, a corporation of Germany
No Drawing. Filed Nov. 16, 1967, Ser. No. 683,448
Claims priority, application Germany, Nov. 30, 1966, H 61,141
Int. Cl. C08g 30/12, 45/12
U.S. Cl. 260—830                              11 Claims

ABSTRACT OF THE DISCLOSURE

This invention relates to a process for the preparation of an internally plasticized hardened epoxide resin having increased flexibility without a substantial effect on its thermal properties which comprises the steps of reacting a mixture consisting essentially of (1) from about 95% to 55% by weight of said mixture of a crystalline triglycidyl isocyanurate having an epoxide oxygen content of at least 14% and (2) from about 5% to 45% by weight of said mixture of long-chain organic compounds having at least two terminal isocyanate groups per molecule and free of other reactive groups, said long-chain organic compounds having a molecular weight between about 800 and 3000, with an organic polycarboxylic acid anhydride epoxide hardener under epoxide resin hardening conditions, and recovering said internally plasticized hardened epoxide resin.

THE PRIOR ART

Hardened synthetic resins, based on organic compounds containing more than one epoxide group in the molecule frequently exhibit a very high resistance to deformation by heat. For example, crystalline triglycidyl isocyanurate shows this characteristic after being hardened with the usual epoxide resin hardening agents. On the other hand, this hardened epoxide resin often leaves much to be desired with regard to its mechanical properties evidenced by its impact strength and flexural strength. Its tendency to develop cracks with changes of temperature renders it useless for various purposes. For example, if metal armatures with grooves and ridges are placed in a casting mixture consisting of crystalline triglycidyl isocyanurate and, for example, of polycarboxylic acid anhydrides, more or less large cracks will become evident with temperature changes. The mechanical, in particular, the elastic properties of such epoxide resins can be improved by an addition to the hardenable mixture of softeners or plasticizers. For this purpose, "external plasticizers" have been considered; however, these involve certain disadvantages. More favorable results can be obtained with "internal plasticizers," but it has been established that with an addition of a small quantity of internal plasticizers, a relatively substantial decline in the resistance to deformation by heat occurs in the hardened resin, causing an unfavorable relation to the obtained improvement of the mechanical properties. In other words, only a slight improvement in the elastic characteristics of the hardened resin is obtained with a considerable loss in the thermal properties.

OBJECTS OF THE INVENTION

An object of the invention is to avoid these shortcomings of the plasticizing processes previously known and to establish a method which will effect a satisfactory flexibilization of the hardened epoxide resins with a relatively small loss of the thermal properties.

A further object of the invention is to develop a process for the preparation of an internally plasticized hardened epoxide resin having increased flexibility without a substantial effect on its thermal properties which comprises the steps of reacting a mixture consisting essentially of (1) from about 95% to 55% by weight of said mixture of a crystalline triglycidyl isocyanurate having an epoxide oxygen content of at least 14% and (2) from about 5% to 45% by weight of said mixture of long-chain organic compounds having at least two terminal isocyanate groups per molecule and free of other reactive groups, said long-chain organic compounds having a molecular weight between about 800 and 3000, with an organic polycarboxylic acid anhydride epoxide hardener under epoxide resin hardening conditions, and recovering said internally plasticized hardened epoxide resin.

Another object of the invention is the production of an internally plasticized hardened epoxide resin based on the reaction of a crystalline triglycidyl isocyanurate having an epoxide oxygen content of at least 14% with an organic polycarboxylic acid anhydride epoxide hardener, having both increased flexibility and good thermal properties.

These and other objects of the invention will become more apparent as the description thereof proceeds.

DESCRIPTION OF THE INVENTION

It has now been discovered that these objects can be achieved in the hardening of hardenable epoxide resins in that crystalline triglycidyl isocyanurate having an epoxide oxygen content of at least 14% is reacted with long-chain organic compounds having at least two terminal free isocyanate groups in the molecule with a molecular weight ranging between 800 and 3,000, preferably between 1,000 and 2,000, and organic polycarpoxylic acid anhydrides. It has to be regarded as a startling fact that in the manner described perfect molded bodies are obtained, since an attempt to react epoxide compounds based on polyvalent phenols or cyclohexene compounds or non-crystalline glycidyl isocyanurates with the same compounds containing free isocyanate groups and organic polycarboxylic acid anhydrides results only in masses with a large content of bubbles.

According to the process of the invention, crystalline triglycidyl isocyanurate is used, prepared in well known manner. It should have an epoxide oxygen content of at least 14%. As a rule, technical mixtures of crystalline triglycidyl isocyanurate in high and low melting form are utilized. Crystalline triglycidyl isocyanurates having the above characteristics are described in U.S. Patent No. 3,337,509, dated Aug. 22, 1967.

The long-chain organic compounds having at least two terminals isocyanate groups per molecule and free of other reactive groups are, for example, linear polyethers and/or linear polyesters with terminal isocyanate groups. These isocyanates are known as such and can be obtained, for example, by the reaction of polyethers having terminal free hydroxyl groups with polyvalent, preferably divalent, organic isocyanates. As polyethers containing terminal free hydroxyl groups are considered, for example, polyoxyalkyleneglycols, such as polyoxyethyleneglycol, polyoxypropyleneglycol, polyoxybutyleneglycol and the like. Instead of or in addition to the polyethers, as compounds containing terminal free hydroxyl groups, also polyesters can be employed, prepared in well-known manner from organic dicarboxylic acids and an excess of dihydric alcohols by esterification. Suitable polyesters can be prepared, for example, from adipic acid, succinic acid, sebacic acid, phthalic acid, hexahydroterephthalic acid, terephthalic acid, maleic acid, fumaric acid, by esterification with alkanediols, such as ethyleneglycol, propyleneglycol and heptanediol, and glycols, such as diethyleneglycol or thiodiglycol. Moreover, polyesters based on caprolactone are suitable.

Finally, long-chain polyhydric alcohols can be used as compounds containing free terminal hydroxyl groups, for example, dimerized fatty alcohols.

The reaction of these compounds having free terminal hydroxy groups to give long-chain organic compounds having at least two terminal isocyanate groups is conducted with low-molecular-weight organic diisocyanates, such as toluylene diisocyanate, diphenylmethane diisocyanate, hexamethylene diisocyanate and the like. The compounds containing isocyanate groups, which are prepared as previously described, are known as so-called prepolymers for the production of polyurethane synthetics.

Advantageously, the indicated compounds, containing free isocyanate groups, are used at an amount of from 5% to 45% by weight, preferably of 10% to 35% by weight, based on the overall weight of the mixture of crystalline triglycidyl isocyanurate and the compounds containing isocyanate groups.

For the process of the invention the usual, well known polyvalent carboxylic acid anhydrides, suitable as polyadduct formers for epoxide compounds, are employed as the organic polycarboxylic acid anhydrides. For this purpose are considered, for example, hexahydrophthalic acid anhydride, tetrahydrophthalic acid anhydride, phthalic acid anhydride, methylcyclohexanedicarboxylic acid anhydride, dodecenylsuccinic acid anhydride, pyromellitic acid anhydride, endometylenetetrahydrophthalic acid anhydride, methylendomethylenetetrahydrophthalic acid anhydride, etc. It is to be understood that mixtures of these organic polycarboxylic acid anhydrides, as listed in the preceding, can also be used.

The amount of the organic polycarboxylic acid anhydride to be used should be such that 0.6 to 1.2, preferably 0.7 to 0.9 carboxylic acid anhydride groups are present in the hardenable mixture for each epoxide group.

For the accomplishment of the process of the invention, the three reactants can first be admixed with one another, and then melted. Another possibility is to melt the crystalline triglycidyl isocyanurate together with the long-chain organic compounds containing free isocyanate groups, and directly afterwards to introduce the organic polycarboxylic acid anhydride into this melt. In this fashion, liquid mixtures will result which, if so desired, can be stored for extended periods of time in liquid form even at room temperatures without gelatinizing. These liquid pre-reaction products can be exceptionally easily dissolved in organic solvent, such as acetone, butyl acetate, methylene chloride and the like and used, for example, for the impregnation of fibrous materials, such as mineral fiber fabrics, paper and others, or they can be employed as coating agents, preferably for metals. If adequate reaction components are selected, these melt liquid mixtures can also solidify at room temperature, and can be used in the subsequently compact form as fluidized bed sinter powder, after having been pulverized.

The actual reaction or hardening of the reaction compounds into the hardened internally plasticized epoxide resins is accomplished at elevated temperatures of between 100° C. to 200° C., preferably between 120° C. to 180° C. The duration of this reaction or hardening process lasts about 1 to 20, preferably 2 to 8 hours. In most cases, the formation of the hardened epoxide resin is complete after this time. However, it can be advantageous to temper the molded bodies for a certain length of time at higher temperatures of, for example, about 150° C. to 210° C.

To the mixtures prepared according to the invention process, dyes or fillers may be added in the usual manner as, for example, metallic powder, quartz powder, glass powder, glass fibers, mica, aluminum oxide, titanium oxide, zirconium oxide, pulverized dolomite or barium sulfate.

Especially advantageously the synthetic resins, prepared according to the invention, can be used as casting resins. It is possible, for example, to cast them around intricate armatures without causing any cracking on the edges or grooves during the hardening process. The electrical properties of the epoxide resins, prepared according to the method of the invention, show no decline with regard to the excellent values measured on molded bodies, hardened with organic polycarboxylic acid anhydrides, based on crystalline triglycidyl isocyanurate. In comparison with these, the epoxide resins of the invention manifest a superior impact strength and flexural strength.

In addition, these epoxide resins thus prepared can be used as adhesives, putty and coatings.

The following specific embodiments are illustrative of the practice of the invention. They are not, however, to be deemed limitative in any manner.

In the following examples, the Martens temperature the impact strength, the deflection and the surface leakage of current have been determined according to DIN 53,458, DIN 53,453, DIN 53,452 and DIN 53,480.

EXAMPLE 1

Several mixtures were prepared each consisting of 100 gm. of triglycidyl isocyanurate (mixture of the high and low melting forms; epoxide oxygen content, 15.5%) and 140 gm. of hexahydrophthalic acid anhydride. The mixtures were melted together with various amounts of a diisocyanate, which had been obtained by reacting a polybutylene-glycol-1,4 (molecular weight, 1000) with an excess of toluylene diisocyanate, and which had a free isocyanate content of 6.3%. After the components had been thoroughly admixed at a temperature of 110° C., molded bodies measuring 10 x 15 x 120 mm. were cast and hardened for 5 hours at 110° C. and for 16 hours at 150° C.

The results of tests of the molded bodies are shown in the following Table I. The first column indicates the amount of the diisocyanate added. The following columns show the Martens temperature, the impact strength, the deflection and the flexural strength. The surface leakage of current was in all cases KA3c.

TABLE I

| Diisocyanate, gm. | Martens Temp.,° C. | Impact Strength kp. cm./cm.² | Deflection, mm. | Flexural Strength, kp./cm.² |
|---|---|---|---|---|
| 0 | 170 | 13 | 4 | 600 |
| 25 | 160 | 17 | 5 | 800 |
| 43 | 150 | 22 | 7 | 800 |
| 67 | 109 | >27 | 11 | 1,000 |

EXAMPLE 2

The process described in Example 1 was repeated. However, in place of the diisocyanate utilized therein, a reaction product of 1 mol. of polypropyleneglycol-1,2 (molecular weight: 1,000) with 2 mols of toluylene diisocyanate (isocyanate content=5.9%) was employed.

The following Table II indicates the values measured of the molded bodies with reference to the addition of the diisocyanate. The surface leakage of current amounted to KA3c in all cases.

TABLE II

| Diisocyanate, gm. | Martens Temp.,° C. | Impact Strength kp. cm./cm.² | Deflection, mm. | Flexural Strength, kp./cm.² |
|---|---|---|---|---|
| 0 | 170 | 14 | 4 | 620 |
| 25 | 162 | 16 | 6.5 | 910 |
| 43 | 145 | 22 | 8 | 950 |

EXAMPLE 3

The process described in Example 2 was repeated with the exception that for the preparation of the diisocyanate, in place of a polypropyleneglycol with a molecular weight of 1,000, a polypropyleneglycol with a molecular weight of 2,000 was used. This diisocyanate had a content of 3.4% of free isocyanate groups.

As previously described, molded bodies were cast and hardened for 5 hours at 110° C. and then for 15 hours at 150° C. The values measured on these molded bodies are given in Table III, based on the amount of diisocyanate used.

TABLE III

| Diisocyanate, gm. | Martens Temp.,° C. | Impact Strength kp. cm./cm.² | Deflection, mm. | Flexural Strength, kp./cm.² |
|---|---|---|---|---|
| 0 | 170 | 14 | 4 | 620 |
| 25 | 160 | 17 | 9 | 990 |
| 43 | 140 | 26 | 10 | 900 |

EXAMPLE 4

Variable amounts of triglycidyl isocyanurate (technical mixture of high and low melting forms; epoxide oxygen content, 15.5%) were melted together with various amounts of tetrahydrophthalic acid anhydride and the diisocyanate described in Example 1.

After the components had been thoroughly admixed, molded bodies measuring 10 x 15 x 120 mm. were cast and hardened for 5 hours at 110° C. and thereafter for 16 hours at 150° C.

Table IV shows in the first three columns the amounts used of triglycidyl isocyanurate, tetrahydrophthalic acid anhydride and the diisocyanate. The following columns indicate the measured values of the molded bodies of the Martens temperature, impact strength, deflection and flexural strength.

TABLE IV

| TGI,¹ gm. | THPA,² gm. | Diisocyanate, gm. | Martens Temp., ° C. | Impact Strength kp. cm./cm.² | Deflection, mm. | Flexural Strength kp./cm.² |
|---|---|---|---|---|---|---|
| 90 | 140 | 10 | 160 | 16.5 | 6 | 1,080 |
| 175 | 193 | 75 | 149 | >27 | 8 | 1,120 |

¹ TGI = triglycidyl isocyanurate.
² THPA = tetrahydrophthalic acid anhydride.

EXAMPLE 5

Mixtures were prepared from 100 gm. of triglycidyl isocyanurate (epoxide oxygen content, 15.5%), 140 gm. of methylhexahydrophthalic acid anhydride, and with 20% and then with 30%, based on the total weight of triglycidyl isocyanurate and diisocyanate, of the diisocyanate described in Example 1 and then melted. After these components had been admixed, molded bodies measuring 10 x 15 x 120 mm. were cast from the melt, which were then hardened for 5 hours at 110° C. and then for 16 hours at 150° C.

The following Table V gives the values measured of the molded bodies based on the amount of diisocyanate added. All of the molded bodies had a surface leakage of current of KA3c.

TABLE V

| Diisocyanate, gm. | Martens Temp.,° C. | Impact Strength kp. cm./cm.² | Deflection, mm. | Flexural Strength, kp./cm.² |
|---|---|---|---|---|
| 25 | 156 | 15.4 | 7 | 900 |
| 43 | 140 | 19 | 8 | 960 |

EXAMPLE 6

The following mixtures were prepared:

(a)

|  | Gm. |
|---|---|
| Triglycidyl isocyanurate (epoxide oxygen content, 15.4%) | 70 |
| Diisocyanate prepared according to Example 1 | 30 |
| Hexahydrophthalic acid anhydride | 85 |

(b)

|  | Gm. |
|---|---|
| Triglycidyl isocyanurate (epoxide oxygen content, 15.4%) | 60 |
| Diisocyanate prepared according to Example 1 | 40 |
| Hexahydrophthalic acid anhydride | 75 |

The mixtures described in the preceding were melted at 130° C. and, after having been thoroughly admixed, cooled to room temperature. Next, they were stored over a period of 3 months at temperatures ranging between 21° and 23° C. After this period of time they were found to be still in liquid form.

Thereafter, the mixtures were heated to 110° C. and at this temperature the usual molded bodies were cast, which were then hardened for 5 hours at 110° C. and for 15 hours at 150° C. The thus-obtained test bodies had practically the same values as obtained from the liquid mixture without a three-month intermediate storage at room temperature.

From the liquid mixtures previously described, 30% solutions in methylene chloride, in ethylene chloride and in acetone were prepared. Glass fiber mats, impregnated with these solutions and subsequently dried, were compressed to laminate for 15 minutes at a temperature of 165° C. and under a pressure of 15 kg./cm.². The following values were measured on normal small rods, cut out from the compressed mats:

Flexural strength, kp./cm.² _____ 3050
Impact strength, kp. cm./cm.² _____ 164

EXAMPLE 7

A mixture was prepared from 175 gm. of triglycidyl isocyanurate (epoxide oxygen content, 15.6%) and 195 gm. of hexahydrophthalic acid anhydride as well as of 75 gm. of a diisocyanate, which had been prepared by reacting 1 mol of dimerized fatty alcohol ($C_{36}$) with 2 mols of toluylene diisocyanate-1,4. The diisocyanate had an isocyanate content of 9.65%. After the mixture had been melted and homogenized, molded bodies were cast therefrom which were subsequently hardened for 5 hours at 110° C. and for 16 hours at 150° C. The following values were measured on these molded bodies:

Martens temperature, ° C. _____ 147
Impact strength, kp. cm./cm.² _____ 19.0
Flexural strength, kp./cm.² _____ 915
Deflection, mm. _____ 7

EXAMPLE 8

Mixtures were prepared from 160 gm. of triglycidyl isocyanurate (epoxide oxygen content, 15.4%), 195 gm. of hexahydrophthalic acid anhydride and 40 gm. of a diisocyanate of a linear polyester (from adipic acid and ethyleneglycol; molecular weight=420) and toluylene diisocyanate which had a free isocyanate content of 10.5%. These mixtures were melted and molded bodies were cast therefrom which, as described in Example 7, were subsequently hardened. The following values were determined on the test bodies:

Martens temperature, ° C. _____ 156
Impact strength, kp. cm./cm.² _____ 16
Flexural strength, kp./cm.² _____ 1150
Deflection, mm. _____ 7

When, instead of 40 gm. of the diisocyanate, 68.5 gm. of same were used, the following values were obtained:

Martens temperature, ° C. _____ 145
Impact strength, kp. cm./cm.² _____ 20
Flexural strength, kp./cm.² _____ 950
Deflection, mm. _____ 8

The preceding specific embodiments are illustrative of the practice of the invention. It is to be understood, however, that other expedients known to those skilled in the art can be employed without departing from the spirit of the invention.

I claim:
1. A process for the preparation of an internally plasticized hardened epoxide resin having increased flexibility without a substantial effect on its thermal properties which comprises the steps of reacting a mixture con- sisting essentially of (1) from about 95% to 55% by weight of said mixture of a crystalline triglycidyl isocyanurate having an epoxide oxygen content of at least 14% and (2) from about 5% to 45% by weight of said mixture of long-chain organic compounds having at least two terminal isocyanate groups per molecule and free of other reactive groups, said long-chain organic compounds having a molecular weight between about 800 and 3,000, with an organic polycarboxylic acid anhydride epoxide hardener under epoxide resin hardening conditions, and recovering said internally plasticized hardened epoxide resin.

2. The process of claim 1 wherein the amount of said organic polycarboxylic acid anhydride epoxide hardener is chosen so that from 0.6 to 1.2 carboxylic acid anhydride groups are present for each epoxide group.

3. The process of claim 2 wherein 0.7 to 0.9 carboxylic acid anhydride groups are present for each epoxide group.

4. The process of claim 1 wherein the molecular weight of said long-chain organic compounds having at least two terminal isocyanate groups per molecule is between about 1,000 and 2,000.

5. The process of claim 1 wherein said mixture consists of from 90% to 65% by weight of said crystalline triglycidyl isocyanurate and from 10% to 35% by weight of said long-chain organic compounds having at least two terminal isocyanate groups per molecule.

6. The process of claim 1 wherein said long-chain organic compounds having at least two terminal isocyanate groups per molecule are selected from the group consisting of linear polyoxyalkylene glycols reacted with an excess of an organic diisocyanate and linear polyesters having at least two terminal hydroxyl groups reacted with an excess of an organic diisocyanate.

7. The process of claim 1 wherein said long-chain organic compounds having at least two terminal isocyanate groups per molecule is the reaction product of a dimerized higher fatty alcohol with an organic polyisocyanate.

8. The hardened internally plasticized epoxide resin having increased flexibility without a substantial effect on its thermal properties produced by the process of claim 1.

9. A process for the preparation of a stable, sub-resinous, heat hardenable epoxide resin, which when hardened, has increased flexibility without a substantial effect on its thermal properties, which comprises the steps of reacting a mixture consisting essentially of (1) from about 95% to 55% by weight of said mixture of a crystalline triglycidyl isocyanurate having an epoxide oxygen content of at least 14% and (2) from about 5% to 45% by weight of said mixture of long-chain organic compounds having at least two terminal isocyanate groups per molecule and free of other reactive groups, said long-chain organic compounds having a molecular weight between about 800 and 3,000, with an organic polycarboxylic acid anhydride epoxide hardener at a temperature and for a time sufficient to melt said components, immediately cooling said melt to room temperature, and recovering said stable, sub-resinous, heat hardenable epoxide resin.

10. The stable, sub-resinous, hardenable epoxide resin produced by the process of claim 9.

11. Hardenable liquid compositions comprising the stable, sub-resinous, heat hardenable epoxide resin produced by the process of claim 9 dissolved in an organic solvent.

References Cited

UNITED STATES PATENTS

| | | | |
|---|---|---|---|
| 3,426,097 | 2/1969 | Ilkka et al. | 260—77.5 X |
| 3,337,509 | 8/1967 | Budnowski | 260—77.5 |
| 3,309,261 | 3/1967 | Schiller et al. | 260—830 |
| 3,158,586 | 11/1964 | Krause | 260—77.5 X |
| 3,048,560 | 8/1962 | Markhart | 260—830 |
| 3,015,643 | 1/1962 | Markhart | 260—830 |

FOREIGN PATENTS

| | | |
|---|---|---|
| 890,745 | 3/1962 | Great Britain. |

HOSEA E. TAYLOR, Jr., Primary Examiner

C. W. IVY, Assistant Examiner

U.S Cl. X.R.

117—124, 140; 260—2, 33.8, 37, 75, 77.5; 264—137